US010671491B2

(12) United States Patent
Boucher et al.

(10) Patent No.: US 10,671,491 B2
(45) Date of Patent: Jun. 2, 2020

(54) ASSET BROWSING AND RESTORATION OVER A NETWORK USING PRE-STAGING AND DIRECTORY STORAGE

(71) Applicant: Longsand Limited, Cambridge, CAM (GB)

(72) Inventors: Mike Boucher, Southborough, MA (US); Joseph S Ficara, Southborough, MA (US)

(73) Assignee: MICRO FOCUS LLC, Santa Clara, CA (US)

( * ) Notice: Subject to any disclaimer, the term of this patent is extended or adjusted under 35 U.S.C. 154(b) by 448 days.

(21) Appl. No.: 15/032,406

(22) PCT Filed: Nov. 1, 2013

(86) PCT No.: PCT/US2013/068007
§ 371 (c)(1),
(2) Date: Apr. 27, 2016

(87) PCT Pub. No.: WO2015/065468
PCT Pub. Date: May 7, 2015

(65) Prior Publication Data
US 2016/0274979 A1 Sep. 22, 2016

(51) Int. Cl.
*G06F 11/14* (2006.01)
*G06F 17/00* (2019.01)
(Continued)

(52) U.S. Cl.
CPC ............ *G06F 11/1464* (2013.01); *G06F 9/50* (2013.01); *G06F 16/172* (2019.01); *G06F 17/00* (2013.01);
(Continued)

(58) Field of Classification Search
CPC ......... G06F 17/30029; G06F 17/30064; G06F 17/30598; G06F 17/30386;
(Continued)

(56) References Cited

U.S. PATENT DOCUMENTS 5,941,951 A * 8/1999 Day ................. H04N 21/23113
709/233
6,332,163 B1 * 12/2001 Bowman-Amuah ........................
H04L 12/4604
709/217
(Continued)

FOREIGN PATENT DOCUMENTS

EP 1923797 A1 5/2008

OTHER PUBLICATIONS

Campbell et al., Asset Management Excellence, 2011, Second Edition, CRC Press, all pages. (Year: 2011).*
(Continued)

*Primary Examiner* — Jay A Morrison
*Assistant Examiner* — Antonio J Caiado

(57) ABSTRACT

Example embodiments relate to asset browsing and restoration over a network using on demand staging. A method may include accessing a compound asset in the storage system and restoring it as a staged asset in a staging area of the storage access system before receiving an indication from a client device to browse at least a portion of the compound asset. The method may include accessing the internal structure of the staged asset to generate an asset directory, wherein the asset directory indicates discrete items within the compound asset. The method may include storing the asset directory in the storage access system. The method may include providing the stored asset directory or a portion of the stored asset directory to the client device
(Continued)

over a network in response to an indication from the client device to browse the compound asset.

16 Claims, 3 Drawing Sheets

(51) Int. Cl.
| | |
|---|---|
| *G06F 9/50* | (2006.01) |
| *G06F 16/172* | (2019.01) |
| *H04L 29/08* | (2006.01) |

(52) U.S. Cl.
CPC ...... *H04L 67/1097* (2013.01); *G06F 2201/84* (2013.01)

(58) Field of Classification Search
CPC ........... G06F 17/30575; G06F 17/6218; G06F 17/30156; G06F 17/0667; G06F 17/3002; G06F 17/30082; G06F 17/302; G06F 17/30215; G06F 3/0605; G06F 3/0631; G06F 3/067; G06F 16/172; G06F 11/1464; G06F 9/50; G06F 17/00; G06F 2201/84; G06Q 30/02; G06Q 30/0206; G06Q 50/188; H04L 63/0428; H04L 67/1097
See application file for complete search history.

(56) References Cited

U.S. PATENT DOCUMENTS

| | | | |
|---|---|---|---|
| 6,581,045 B1 | 6/2003 | Watson | |
| 6,654,029 B1 | 11/2003 | Chiu et al. | |
| 6,671,801 B1* | 12/2003 | Prakash | G06F 9/44505 709/220 |
| 7,117,259 B1* | 10/2006 | Rohwer | H04L 65/4069 709/223 |
| 7,149,859 B2 | 12/2006 | Fujibayashi | G06F 3/0607 711/162 |
| 7,158,479 B1* | 1/2007 | Noble | H04L 43/026 370/208 |
| 7,225,249 B1* | 5/2007 | Barry | G06F 17/3089 709/227 |
| 7,313,579 B2* | 12/2007 | Murotani | G06F 17/30067 |
| 7,426,499 B2* | 9/2008 | Eder | G06F 17/30867 706/20 |
| 7,574,418 B1 | 8/2009 | Patterson et al. | |
| 7,865,519 B2 | 1/2011 | Stuhec | |
| 7,974,965 B2 | 7/2011 | Woolf et al. | |
| 8,086,646 B2 | 12/2011 | Stuhec et al. | |
| 8,135,723 B2 | 3/2012 | Vaid et al. | |
| 8,166,038 B2* | 4/2012 | Kaufman | G06F 17/30997 380/45 |
| 8,214,336 B2 | 7/2012 | Cohen et al. | |
| 8,473,531 B2 | 6/2013 | Wade et al. | |
| 8,768,973 B2 | 7/2014 | Hagenbuch et al. | |
| 8,856,128 B2 | 10/2014 | Zasman et al. | |
| 9,128,946 B2 | 9/2015 | McGeehan | |
| 9,652,346 B2 | 5/2017 | Wall et al. | |
| 9,727,628 B2 | 8/2017 | Stading et al. | |
| 2003/0046282 A1* | 3/2003 | Carlson | G06F 8/36 |
| 2003/0110188 A1 | 6/2003 | Howard et al. | |
| 2004/0172318 A1* | 9/2004 | Shen | G06Q 40/00 705/35 |
| 2004/0267831 A1 | 12/2004 | Wong et al. | |
| 2005/0137983 A1 | 6/2005 | Bells | |
| 2005/0193269 A1* | 9/2005 | Haswell | G06F 11/3684 714/38.13 |
| 2005/0222933 A1 | 10/2005 | Wesby | |
| 2006/0178954 A1* | 8/2006 | Thukral | G06Q 10/087 705/28 |
| 2006/0179076 A1* | 8/2006 | Weber | G06Q 10/00 |
| 2006/0230244 A1* | 10/2006 | Amarendran | G06F 3/0619 711/162 |
| 2007/0185879 A1* | 8/2007 | Roublev | G06F 17/30073 |
| 2007/0198609 A1* | 8/2007 | Black | G06Q 10/087 |
| 2007/0260621 A1 | 11/2007 | Smolen et al. | |
| 2007/0271273 A1* | 11/2007 | Cradick | G06F 11/3636 |
| 2008/0005194 A1* | 1/2008 | Smolen | G06F 17/30348 |
| 2008/0263103 A1* | 10/2008 | McGregor | G06F 21/6218 |
| 2008/0263610 A1* | 10/2008 | Murray | G06F 17/30017 725/110 |
| 2009/0089254 A1* | 4/2009 | Von Kaenel | G06F 17/30241 |
| 2009/0300173 A1* | 12/2009 | Bakman | G06F 11/008 709/224 |
| 2010/0010968 A1 | 1/2010 | Redlich et al. | |
| 2010/0150122 A1 | 6/2010 | Berger et al. | |
| 2010/0312805 A1 | 12/2010 | Noonan, III | |
| 2011/0055298 A1* | 3/2011 | Wade | G06F 11/1435 707/827 |
| 2011/0131495 A1* | 6/2011 | Bull | G11B 27/105 715/716 |
| 2011/0138025 A1 | 6/2011 | Kobi et al. | |
| 2011/0145526 A1* | 6/2011 | Parham | G06F 3/061 711/162 |
| 2011/0258049 A1* | 10/2011 | Ramer | G06F 17/30867 705/14.66 |
| 2011/0320956 A1* | 12/2011 | Singh | G06O 30/0241 715/747 |
| 2012/0221668 A1 | 8/2012 | Chen et al. | |
| 2012/0221696 A1* | 8/2012 | Ferris | H04L 67/327 709/223 |
| 2012/0309515 A1* | 12/2012 | Chung | H04N 21/274 463/31 |
| 2013/0006945 A1 | 1/2013 | Prahlad et al. | |
| 2013/0041808 A1* | 2/2013 | Pham | H04L 65/1083 705/39 |
| 2013/0085999 A1 | 4/2013 | Tung et al. | |
| 2013/0204872 A1* | 8/2013 | Runchey | G06F 17/30283 707/736 |
| 2013/0232122 A1* | 9/2013 | Fitzgerald | G06F 8/60 707/679 |
| 2013/0238572 A1* | 9/2013 | Prahlad | G06F 3/0649 707/692 |
| 2013/0263119 A1* | 10/2013 | Pissay | G06F 9/45558 718/1 |
| 2013/0263289 A1* | 10/2013 | Vijayan | G06F 21/60 726/31 |
| 2014/0250093 A1* | 9/2014 | Prahlad | G06F 11/1453 707/696 |
| 2015/0024852 A1* | 1/2015 | Pacey | A63F 13/67 463/43 |
| 2016/0234475 A1* | 8/2016 | Courchesne | H04N 7/157 |
| 2018/0084306 A1* | 3/2018 | Hunter | H04H 60/31 |
| 2018/0121530 A1* | 5/2018 | McGregor | G06F 17/30029 |

OTHER PUBLICATIONS

Bowker, M. et al., "The Data Center of the Future," (Research Paper), Enterprise Strategy Group, White Paper, Mar. 2010, 9 pages, available at http://www.cristie.co.uk/uploads/media/ESG_wp_The_Data_Center_of_the_Future.pdf.

International Search Report & Written Opinion received in PCT Application No. PCT/US2013/068007, dated Aug. 5, 2014, 12 pages.

Baer, "Introduction to Shredded Storage in Sharepoint 2013," (Web Page), Nov. 12, 2012, 4 pages. available at http://blogs.technet.com/b/wbaer/archive/2012/11/12/introduction-to-shredded-storage-in-sharepoint-2013.aspx.

International Search Report & Written Opinion dated Aug. 7, 2014 received in PCT Application No. PCT/US2013/068024, filed Nov. 1, 2013, Korean Intellectual Property Office, 9 pages.

* cited by examiner

ASSET BROWSING AND RESTORATION OVER A NETWORK USING PRE-STAGING AND DIRECTORY STORAGE

BACKGROUND

Cloud computing may refer to a computing model where resources (e.g., computing, storage, etc.) are maintained in data centers and provided to remote clients. As one example, a data center may provide virtual machines and related storage (e.g., virtual machine disks or VMDKs) to be used by remote clients. Clients may communicate with the cloud computing environment, for example, to configure their virtual machines and or to access their VMDKs. As another example, clients may backup their data (e.g., files, VMDKs, archive files, etc.) to a data center and may access or restore that data at a later time. Clients may communicate with the cloud computing environment via a network such as the internet, and via a software program, web interface or the like. Such cloud computing environments may be hosted by third parties or vendors, perhaps referred to as hosting organizations. Such hosting organizations may operate large data centers and clients may buy or lease resources (e.g., storage space, virtual machines, etc.) from them. The hosting organizations may (e.g., in the background) virtualize computing resources (e.g., storage disks or the like) to present them to the clients as logical components (e.g., logical storage volumes). In the case of storage resources, the resources may be physically distributed, meaning that, for example, a logical storage volume presented to a client may actually include multiple storage drives or portions of storage drives that span across multiple computing devices (e.g., servers, storage drives, storage racks, etc.) of the hosting organization.

BRIEF DESCRIPTION OF THE DRAWINGS

The following detailed description references the drawings, wherein.

DETAILED DESCRIPTION

Figure 1:
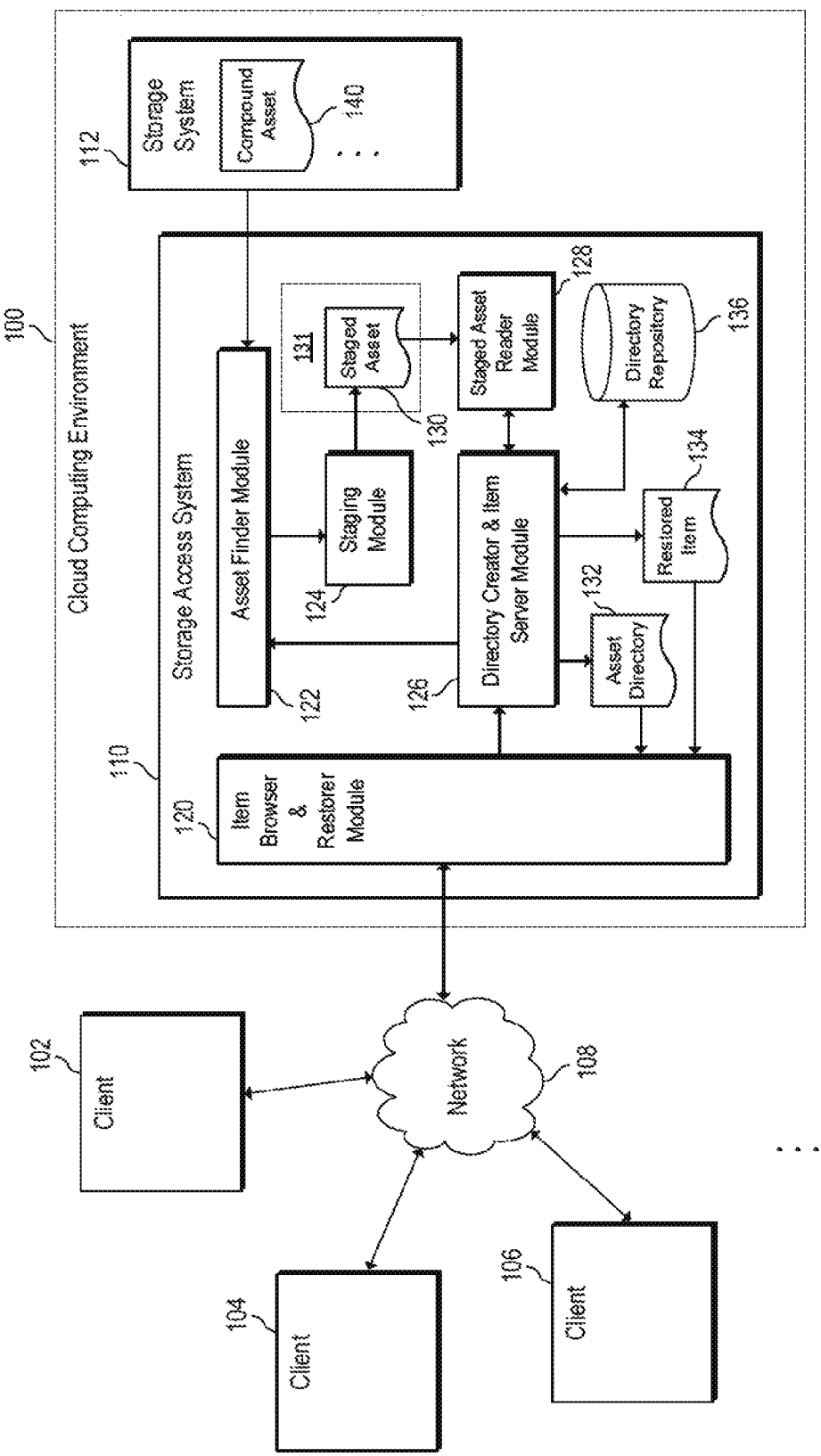
FIG. 1 is a block diagram of an example cloud computing environment that may facilitate asset browsing and restoration over a network.

Various hosting organizations may store data of clients as compound assets, meaning that multiple discrete items of data for a particular client may be packaged and stored as a single asset. For example, a client may own or lease a virtual machine disk (VMDK) in a data center of a hosting organization where the VMDK represents a disk of a virtual machine also owned or leased by the client. Such a VMDK may have, for example, lived in the data center from its inception, or, as another example, the client may have sent an existing VMDK to the data center, e.g., for backup. Such a VMDK may be one example of a compound asset. As another example of a compound asset, a hosting organization may store an archived file (e.g., a .zip file) and/or encrypted file of a client, where such a file is a compound asset. Such a file may have been backed up by the client to the hosting organization. Thus, a compound asset of a user may exist within the cloud computing environment of the hosting organization. A compound asset may include multiple discrete items of data. Here, the term "include" may be used to mean that the compound asset may be interpreted as or deconstructed to reveal multiple discrete items, such as files. Thus, in the example of the VMDK, files making up the file system of the VMDK may be examples of discrete items. In the example of the .zip file or encrypted file, component files that were originally added to the .zip file or encrypted file before compression or encryption were performed may be examples of discrete items.

Storing a client's data as a compound asset may offer various benefits, for example, such as data compression and data encryption. In some situations, a compound asset may be a file type that is usable by some other resource of the cloud computing environment, for example, a VMDK file being usable by a virtual machine. Additionally, storing a client's data as a compound asset may allow the client to perform a high-speed complete restore of the client's entire store of data. Compound assets may be stored in a cloud computing environment in a way such that a particular compound asset may span across multiple computing devices (e.g., servers, storage drives, storage racks, etc.) of the hosting organization. For example, a portion of the data (e.g., bytes) that makes up a compound asset may be stored in one storage drive in one storage rack, and another portion of the data for the same compound asset may be stored in another storage drive of another storage rack. Even within the same storage drive, portions of data for a particular compound asset may not be stored contiguously.

Clients with data stored in cloud computing environment may desire to browse and/or restore their data to the client's remote computing device at some point. In some situations, where a client's data is stored as a compound asset, the client may desire to restore only one or a few discrete items of data instead of all the items in the compound asset. To restore a discrete item from a compound asset, some hosting organizations may require the client to restore the entire compound asset to the client's computing device and then "walk through" (e.g., using a file system on the client's computing device) the compound asset to access the individual items within it. Among other issues, this may require unnecessary time and bandwidth for restoration because the entire compound asset may be sent over the network (e.g., a high-latency network) to the client. Alternative, some hosting organizations may individually store/backup each of the discrete items (e.g., shredding) in addition to storing/backing up the compound asset. The term "shredding" may refer to identifying and extracting all of the discrete items within a compound asset and protecting them so they can be individually retrieved. Backing up both the discrete items and the entire compound asset may allow clients to restore particular discrete items while still allowing the clients to perform a full fidelity restoration (i.e., performing a high-speed complete restore of the client's entire store of data). However, among other issues, backing up both the discrete items and the compound asset may result in the need for increased storage space.

The present disclosure describes improved asset browsing and restoration over a network (e.g., a high-latency network) using pre-staging and directory storage. According to the present disclosure, clients may be able to restore a discrete item of a compound asset without restoring the entire compound asset. Thus, only discrete items that are requested to be restored are sent over the network. Additionally, such restoration may be performed without requiring shredding of the compound asset. Thus, only the compound asset may need to be stored in the cloud computing environment. According to the present disclosure, in a cloud computing environment, at least a portion of a compound asset may be restored (e.g., temporarily) to a staging area. Such staging may be performed in advance or proactively, e.g., before a client requests to browse the compound asset. The internal structure of the staged asset may be accessed (e.g., using an API) to generate an asset directory, which may be stored in the cloud computing environment. The asset directory may indicate discrete items within the compound asset. After this, the staged asset in the staging area may, at some point, be deleted or removed. The cloud computing environment may receive a request from the client to browse the compound asset. The cloud computing environment may then access the stored asset directory for the compound asset, and may provide the asset directory to the client over the network. The cloud computing environment may receive a request from the client indicating a discrete item to be restored. In the cloud computing environment, at least a portion of the compound asset may be restored (e.g., temporarily) to the staging area, for example, if the requested portions of the compound asset are not still staged from an earlier staging. The cloud computing environment may then access (e.g., using the API) the internal structure of the staged asset to generate at least one restored item and provide it to the client. After this, the staged asset in the staging area may, at some point, be deleted or removed.

The present disclosure may satisfy at least two data restoration goals—the ability to restore discrete items, and the ability to perform a full fidelity restoration. At the same time, storage space required by the cloud computing environment may be reduced because only the compound asset may need to be stored long term. Because an asset directory is generated based on the compound asset, clients may still quickly navigate the compound asset and quickly identify discrete items within the compound asset. Because asset directories may be generated in advance or proactively and stored, a client request that is limited to browsing a compound asset may be handled quickly by accessing a stored asset directory without the need to stage a large compound asset only for the purpose of browsing. This may also reduce the bandwidth and resources in the storage environment that may be required for staging. With regard to restoring discrete items to the client, because the internal structure of the staged asset may be accessed to extract requested discrete items, and because only these items are sent to the client over the network (e.g., a high-latency network), restoration time and bandwidth is improved.

FIG. 1 is a block diagram of an example cloud computing environment 100 that may be in communication with a number of clients (e.g., 102, 104, 106) via a network (e.g., 108). Network 108 may be any wired and/or wireless network, and may include any number of hubs, routers, switches or the like. Network 108 may be, for example, part of the internet, at least one intranet and/or other type(s) of network(s). In some examples, network 108 may be a high-latency network, meaning that users may experience a noticeable delay between the sending and receiving of data. Clients 102, 104, 106 may each be any computing device, virtual machine or the like that is capable of communicating with a cloud computing environment (e.g., 100) over a network (e.g., 108). Each client may run a software program, web browser (e.g., to connect to a web interface provided by the cloud computing environment) or the like to allow a user of the client to access the cloud computing environment. Via such a software program or web interface, each client may send data (e.g., VMDK files, archived files, etc.) to the cloud computing environment 100, e.g., for backup. Additionally, via such a software program or web interface, each client may access and configure resources that they own or lease in the cloud computing environment 100. The terms "client" and "user" may be used in similar contexts, but may be different. The term client may refer to a physical computing device, virtual machine or the like, whereas the term user may refer to the individual (e.g., human) that is interacting with the client, for example, to restore the user's data. Various descriptions herein may refer to a client or user performing a task, and it should be understood that if a client performs a task, a related user may have caused such a task to be performed. Likewise, if a user performs a task, a related client may actually perform the task based on the user's input. Thus, descriptions that mention client or user may be interpreted in a flexible manner.

Cloud computing environment 100 may include a storage access system 110 and a storage system 112. Storage access system 110 may handle requests from clients (e.g., 102, 104, 106), for example, requests to browse and/or restore data. Storage access system 110 may communicate with at least one storage system 112, for example, to access at least one compound asset (e.g., 140). Storage access system 110 may also allow clients to access and configure other resources (e.g., virtual machines) of cloud computing environment 100; however, for ease of description, system 110 is described and labeled in a storage-related manner. Storage access system 110 may be at least one computing device (e.g., server) that is capable of communicating with at least one client (e.g., 102, 104, 106) and accessing at least one storage system (e.g., 112). In some embodiments of the present disclosure, storage access system 110 may include more than one computing device. In other words, the components shown in storage access system 110 (e.g., modules, repositories, inputs, outputs, etc.) in FIG. 1 may be, but need not be, distributed across multiple computing devices, for example, computing devices that are in communication with each other via a network. In these embodiments, the computing devices may be separate devices, perhaps geographically separate. Thus, the term system may be used to refer to a single computing device or multiple computing devices that operate together to provide a service.

Storage access system 110 may include a number of modules (e.g., 120, 122, 124, 126, 128). Each of these modules may include a series of instructions encoded on a machine-readable storage medium (e.g., 320 of FIG. 3) and executable by a processor (e.g., 310) of a storage access system (e.g., 300). In addition or as an alternative, each module may include one or more hardware devices including electronic circuitry for implementing the functionality described below. With respect to the modules described and shown herein, it should be understood that part or all of the executable instructions and/or electronic circuitry included within one module may, in alternate embodiments, be included in a different module shown in the figures or in a different module not shown. Storage access system 110 may include a number of pieces of data (e.g., 130, 132, 134). Each of these pieces of data may be stored (e.g., temporarily) in storage access system 110 (e.g., in volatile or non-volatile memory). In some examples, each of these pieces of data may be stored on a storage device that is external to storage access system 110, for example, a storage device in storage system 112, or some other storage device in cloud computing environment 100. Storage access system 110 may include at least one repository (e.g., directory repository 136). The term repository may generally refer to a data store that may store digital information. Each of these repositories may include or be in communication with at least one physical storage mechanism (e.g., hard drive, solid state drive, tap drive or the like) capable of storing information including, for example, a digital database, a directory, a file capable of storing text, media, code, settings or the like, or other type of data store.

Item browser & restorer module 120 may allow at least one client (e.g., 102, 104, 106) to interact with storage access system 110. Module 120 may handle requests to backup data and/or requests to restore data. The term "request" may refer to signals or indications that are generated as a client interacts with module 120.

As one specific example, module 120 may provide clients with a user interface (e.g., a web interface) that may allow users of the particular clients to browse data (e.g., files) in the cloud computing environment. The user interface may provide a visual tree-like structure where high level directories, folders or containers are represented with a particular icon (e.g., a folder icon) and where sub-directories/folders/containers within other directories/folders/containers are represented with different icons or with differently positioned icons or the like. The user interface may allow a user to click on certain icons or hyperlinks, for example, to navigate or drill-down into various directories/folders/containers. Such clicks or navigation may generate browsing "requests" that may be used by other modules (e.g., module 122) of the storage access system 110, e.g., to identify a stored asset directory or directory portion to provide to the client. Continuing with this specific example, files or data that are contained within a particular directory/folder/container may be indicated with particular icons (e.g., a document icon) as well. Then, users may be able to select particular files or data, and then indicate that such files/data should be restored. Such selections and indications may generate restoration "requests" that may be used by other modules (e.g., module 122) of the storage access system 110, e.g., to determine compound assets or portions of compound assets to find, retrieve and/or restore (e.g., from storage system 112). In some examples, module 120 may include a physical piece of hardware or electronic circuitry that is used to serve user interface features to clients.

As another example, module 120 may provide clients with the data necessary to build or populate a user interface, and the client may generate its own user interface from data sent to it by module 120. In this situation, module 120 may not directly provide the user interface to the client. Instead module 120 may provide data (e.g., directory-tree data) to the client. Then, the client may navigate or drill-down into various directories/folders/containers and select particular files or data to be restored via the client-generated user interface. Such navigations, selections and indications may cause the client-generated user interface to send signals back to module 120, which may then cause module 120 to generate browsing or restoration "requests" that may be used by other modules (e.g., module 122) of the storage access system 110.

Item browser & restorer module 120 may cause various other modules (e.g., module 126) to perform various functions, for example, in response to a user browsing or navigating their data (e.g., a tree-like structure). As one particular example, storage access system 110 may generate and store (e.g., proactively) asset directories for compound assets (e.g., compound asset 140) of the various clients that use the storage environment to store data. This proactive directory generation and storage may be described in more detail below. Then, at some later time, a user may access or log into (e.g., via module 120) the storage access system 110. In response, module 120 may indicate to module 126 that it should find at least one asset directory (e.g., stored in repository 136) that is associated with the user. An asset directory or portion may then be provided to the user (e.g., via module 120) to allow the user to begin browsing the compound asset. As the user browses (e.g., via module 120) the compound asset (e.g., drilling further down the tree or into different directories/folders), module 120 may indicate to module 126 that further portions of the asset directory are needed, and those portions may be retrieved and provided to the user, e.g., on-the-fly.

Item browser & restorer module 120 may communicate with directory creator and item server module 126 to receive information in response to requests from clients. Then, module 120 may provide such information to the requesting client (e.g., client 102). For example, module 120 may receive an asset directory (e.g., 132) or directory portion from module 126, for example, in response to a user browsing or navigating their data via module 120. The asset directory (e.g., a tree-like structure) may update (e.g., on demand or on the fly) as the user continues to navigate, and thus the information provided to the client may update as well. As another example, module 120 may receive at least one restored item (e.g., 134), for example, in response to a user requesting that a discrete item be restored.

Storage system 112 may be any collection of at least one storage device (e.g., hard drive, optical drive, tape drive or the like). Storage system 112 may include at least one storage controller that may service storage requests and distribute storage requests across the at least one storage device of the storage system 112. Storage system 112 may include one or more enclosures that house the at least one storage devices. For example, an enclosure may be a storage rack that houses at least one storage controller and/or multiple hard drives. In some examples, storage system 112 may include multiple enclosures (e.g., storage racks). In some examples, storage system 112 may be part of (e.g., within the same enclosure as) storage access system.

Storage system 112 may store at least one compound asset (e.g., 140), for example, a compound asset that includes multiple component pieces of data (e.g., files). In other words, compound asset 140 may be interpreted as or deconstructed into multiple discrete items. Compound asset 140 may be stored in a way such that it spans across multiple computing devices and/or storage devices (e.g., storage racks, storage drives, etc.) of storage system 112. For example, a portion of the data (e.g., bytes) that makes up compound asset 140 may be stored in one storage drive in one storage rack, and another portion of the data for compound asset 140 may be stored in another storage drive of another storage rack. Even within the same storage drive, portions of data for compound asset 140 may not be stored contiguously. Compound asset 140 may be any type of larger data piece that is made up of multiple component pieces of data. For example, compound asset 140 may be a virtual machine disk (VMDK) that includes multiple component files, e.g., organized by a file system of the VMDK. As another example, compound asset 140 may be a .zip file that includes multiple component files, perhaps in a compressed format. As another example, compound asset 140 may be an archive or database that includes multiple files either in a compressed or uncompressed format.

Asset finder module 122 may communicate with module 126 to receive indications that data should be retrieved from storage system 112, for example, based on user requests (e.g., restoration requests). Asset finder module 122 may find and retrieve compound assets (e.g., 140) from at least one storage system (e.g., 112). In some examples, asset finder module may find and retrieve at least one portion or part of a compound asset.

Asset finder module 122 may find and retrieve compound assets or portions of compound assets in various situations. As one example, module 122 may find and retrieve compound assets proactively (e.g., before any browsing requests are received from clients associated with those compound assets) in order to proactively stage the compound assets and proactively create and store asset directories for various clients that use storage environment 100. Such proactive asset retrieval, staging and directory creation may be performed in response to various situations. For example, a new or updated asset directory may be created each time the user's data changes (e.g., causing the compound asset in the storage system to change) or each time the user's data changes significantly. As another example, a new or updated asset directory may be created whenever a user logs into the storage access system 110. As another example, a new or updated asset directory may be created after a defined period of time (e.g., a period of time since the last time the asset directory was updated). As another situation in which asset finder module 122 may find and retrieve compound assets or portions of compound assets, module 126 may receive a restoration request from module 120 in response to a user selecting at least one discrete item to restore. Module 126 may then send an indication to module 122, and in response, module 122 may retrieve the entire compound asset or a portion of the compound asset needed to service the restoration request.

In some examples, a request of a user (e.g., via module 120) may not require asset finder module 122 to retrieve new data from storage system 112. For example, as described in more detail below, in some examples, a user may in some situations only desire to navigate their data and see what files are backed up. In such a situation, an asset directory that is saved in the storage access system (e.g., in directory repository 136) may be used to service such a request. In such a situation, module 126 may receive a user browsing request and determine that data does not need to be retrieved from storage system 112 to service such a request. Then, module 126 may find and retrieve an asset directory (e.g., in repository 136) or directory portion and provide it to the user/client via module 120.

Asset finder module 122 may, in some examples, find and retrieve portions or parts of compound assets on the fly or on demand based on indications from module 126. These indications may occur, for example, when module 126 receives a restoration request from module 120 in response to a user selecting at least one discrete item to restore. The indications from module 126 may vary in their granularity, that is, module 126 may indicate that more data be retrieved than is necessary to service the client request (coarser granularity), or module 126 may indicate that only precise data needed to service the request be retrieved (finer granularity). As one example, in a cache-based approach, as a user navigates their data, e.g., by viewing a tree-like structure and interacting with module 120, it may be more or less likely that the user will select to restore items from various portions of the compound asset. Thus, module 126 may indicate that data be retrieved to service the request and likely future requests. In other examples, asset finder module 122 may retrieve portions or parts of a compound asset, on the fly, at an even finer granularity than the cache-based example. In these examples, asset finder module 122 may retrieve only the precise data (e.g., bytes) that is requested by the user. This may be referred to as a filter based approach (or filter driver approach).

Asset finder module 122 may, when retrieving a compound asset (e.g., 140) or a portion of a compound asset, configure the component portions of data (e.g., bytes) such that they are contiguous and sequential. As described above, a compound asset may be stored (e.g., in storage system 112) in a way such that it spans across multiple computing devices and/or storage devices of the storage system. Additionally, the compound asset may be stored according to a version control routine where a base compound asset is stored and then changes to the base asset are stored as "deltas" to the base asset. Asset finder module 122 may locate the necessary component data portions to retrieve the requested compound asset (or part) and may assemble a continuous, sequential chain of data to create a staged asset (e.g., 130) that can be read (e.g., by module 128) in a contiguous manner. A contiguous, sequential chain of data may be, for example, a configuration of data that resembles how the data of the compound asset was configured before it was stored in storage system 112. If the compound asset includes any "deltas," asset finder module 122 may also locate these deltas and apply the changes such that the contiguous, sequential chain of data is up to date. In some examples, the task of locating the necessary component data portions and assembling them into a contiguous, sequential chain of data, and perhaps applying deltas, may be performed in storage system 112, in which case, the data may already be in a contiguous format when returned to asset finder module 122.

In some examples, asset finder module 122 may be referred to as an asset finder. In one particular example, the term asset finder may refer to examples where asset finder module 122 is at least one hardware device that includes electronic circuitry for implementing the functionality of module 122 as described herein. In some examples, staging module 124 may be referred to as an asset stager. In one particular example, the term asset stager may refer to examples where staging module 124 is at least one hardware device that includes electronic circuitry for implementing the functionality of module 124 as described herein.

Asset finder module 122 may pass retrieved compound assets or parts of compound assets to staging module 124 such that module 124 may restore (e.g., temporarily) the compound asset or part.

Staging module 124 may receive a compound asset (e.g., 140) or a part of a compound asset that was retrieved by asset finder module 122. As mentioned above, asset finder module 122 may find and retrieve compound assets or portions of compound assets in various situations, for example, proactively and/or in response to a user selecting at least one discrete item to restore. Staging module 124 may restore the compound asset (or part), for example, by saving the compound asset (or part) as in staging area 131. Staging area 131 may be a designated storage area, for example, in storage access system 110 or in some external storage system. The asset stored in staging area 131 may be referred to as a "staged asset," for example, staged asset 130. Staged asset 130 may include data that allows for discrete items (e.g., files) to be extracted and/or stated asset 130 may include directory information that indicates the discrete items that are included in compound asset 140.

In some examples, staging module 124 may create an asset "stub" in staging area 131, where the asset stub serves as a data container or a storage starting point for the data of the staged asset (e.g., 130). This asset stub may be a storage location, address or other placeholder in staging area 131 that other modules (e.g., module 128) of storage access system 110 know where to look in order to access the staged asset 130. The asset stub may be of a file type that is the same as the file type of compound asset 140 and of the eventual staged asset 130. For example, compound asset may be a .zip file, and thus, the asset stub may be .zip file type container (e.g., an empty .zip file).

Staging module 124 may save or add data to the asset stub (e.g., on the fly) as staging module 124 receives the data from asset finder module 122. Such data may be a compound asset (or part) received from module 122. Continuing with the example from above, if compound asset 140 and staged asset 130 are of a .zip file type, staging module 124 may save or add a compound asset (e.g., of a .zip file type) or a part of a compound asset to an empty .zip asset stub in the staging area. At any point, the data found at the asset stub may be considered to be the staged asset 130. Thus, the difference between the asset stub and the staged asset may be that the asset stub is a location, address or container that data can be saved at or added to, and the staged asset may be the data that is currently in the container.

As one example of how an asset stub may be useful, assume for a moment that a user selected a few discrete items for restoration. In response to this selection, modules 126, 122, 124 may retrieve a relevant portion of the appropriate compound asset and stage that portion. Because it may be likely that the user will select nearby discrete items for restoration in the near future, modules 122 and 124 may retrieve and restore nearby portions of the compound asset, adding this retrieved compound asset data to the asset stub. Then, soon after selecting the first few discrete items for restoration, the user may select a few more discrete items for restoration, in which case modules 122 and 124 may retrieve and restore other portions of the compound asset because the prediction of which portion of the compound asset the user may restore next may have changed. This is just one example (e.g., a cache based approach) of how data may be retrieved from storage. Other examples manners of retrieving data may be used as well, for example, a filter based approach (described in more detail below).

Staged asset reader module 128 may be used to access the internal structure of staged asset 130, for example, to generate an asset directory (e.g., asset directory 132 or asset directories in repository 136) or to create a restored item (e.g., 134). Staged asset 130 may be of a file type that may not be easily navigated (e.g., by a common file system) or may be of a proprietary file type. As one example, staged asset 130 may be encrypted and/or compressed. Staged asset reader module 128 may understand and may be able to read the file type of staged asset 130. Thus, staged asset reader module 128 may be able to read the internal structure of staged asset 130, for example, to see the individual items (e.g., files) that are included in the staged asset. In some examples, staged asset reader module 128 may be created by the same organization that manages the file type (e.g., file type standard) of staged asset 130.

Staged asset reader module 128 may be any module (e.g., software, hardware, firmware or the like) that can read and understand a particular type of file. For example, module 128 may be an application programming interface (API), for example, an API provided by the same organization that manages the file type standard of staged asset 130. As another example, module 128 may be a file system that knows how to detect the organization (e.g., via a file table or the like) of the staged asset 130, including the locations of the individual items (e.g., files) within the staged asset, and knows how to access the individual items based on the organization.

Staged asset reader module 128 may know the location (e.g., the address) of staged asset 130. More particularly, module 128 may know (e.g., may point to) the location of an asset stub (described in more detail above) in staging area 131, which may indicate the start of data that makes up staged asset 130. In this respect, staged asset reader module 128 may read whatever data has been saved at the asset stub, for example, by staging module 124. This data may be a full compound asset (e.g., based on compound asset 140) or a portion of a compound asset. Module 128 may then analyze the staged asset to determine the internal structure of the staged asset. For example, module 128 may analyze the data to look for a header and/or a file table. Then, module 128 may look for a directory of component items within the data. Module 128 may present this directory of items to other modules (e.g., module 126) of storage access system 110. Module 128 may also use this directory to extract the data of the individual items from staged asset 130. Module 128 may present one or more extracted pieces of data to other modules (e.g., module 126) of storage access system 110, for example, to create at least one restored item (e.g., 134).

Directory creator and item server module 126 may receive user requests (e.g., browsing requests and restoration requests) from module 120. Directory creator and item server module 126 may determine whether data needs to be retrieved from a storage system (e.g., 112) to service requests or whether they can be serviced without such retrieval, for example, if a browsing requests can be serviced using a directory that is stored in directory repository 136. If module 126 determines that data should be retrieved from a storage system, it may indicate as such to asset finder module 122.

Directory creator and item server module 126 may include a low level system or process, for example, to determine whether asset finder module 122 should retrieve data from a storage system (e.g., 112), and if so, at what granularity it should request the data. When module 126 receives a user request (e.g., a restoration request), module 126 may attempt a file system request (e.g., using module 128) to retrieve the required data locally. Module 126 may detect when such a file system requests is attempted to staging area 131, and may intercept such requests, e.g., if no appropriate staged asset exists in staging area 131. Module 126 may then indicate to asset finder module 122 that the data to service the request should be retrieved from a storage system (e.g., 112).

Module 126 may, when indicating to module 122 which data it should retrieve from the storage system, use a cache based approach (see above for an introduction). In some scenarios, as a user restores certain data, it may be more or less likely that the user will next select to restore other pieces of data from various portions of the compound asset. For example, if a user restores a particular file in a particular directory or folder, it may be more likely that other files in the same or nearby directory/folder will be chosen for restoration. In this example, module 126 may send an indication to module 122 to retrieve those files from storage system 112, and those files may be staged (e.g., by module 124). In this respect, portions of the compound asset that include items that are likely to be chosen for restoration are always staged, and it may be unnecessary to stage the entire compound asset.

Module 126 may instead use a filter based approach (see above for an introduction). For the filter based approach, the low level system or process of module 126 may intercept file system requests for particular pieces of data (e.g., files) and may send indications to module 122, on demand, to retrieve only these specific requested pieces of data. For restoration requests, module 126 may indicate to module 122 to retrieve only the precise discrete pieces of data (e.g., files) that need to be provided to the user to service the request. For this filter based approach, only the precise requested data may be provided to the staging module.

Directory creator and item server module 126 may communicate with asset finder module 122. For example, module 126 may determine that an asset directory should be proactively created for a particular compound asset (e.g., 140), and may indicate as such to module 122. In this example, module 122 may initiate retrieval of a compound asset from storage system 112 and staging of the compound asset (e.g., in staging area 131). Module 126 may then communicate with module 128 to access the internal structure of staged asset 130. Based on this information, module 126 may generate an asset directory and may cause the asset directory to be stored in directory repository 136 to service future browsing requests. To generate an asset directory (e.g., asset directory 132 or asset directories in repository 136), directory creator and item server module 126 may receive information that indicates the organization of the staged asset 130, including the hierarchy of the individual items (e.g., files) within the staged asset. Then, module 126 may package or format that information, for example, such that the asset directory includes directory information that can be easily understood by module 120, and presented to users.

As another example, directory creator and item server module 126 may, at a later time, determine that a particular user request (e.g., a browsing request) does not require retrieval of new data from storage system 112 to service the request. A browsing request may be handled using a stored asset directory, e.g., in repository 136. Module 126 may then retrieve an asset directory or directory portion from repository 136 and may provide such directory or directory portion (perhaps after formatting or process) to module 120, e.g., as asset directory 132. This may allow users to quickly browse discrete items in a compound asset (e.g., by viewing a filename, identifier, moniker or the like associated with the items) without the storage access system 110 having to retrieve, stage and create the asset directory at the time that a browsing request is received.

As another example, directory creator and item server module 126 may, at a later time, determine that a user request (e.g., a restoration request) was received (e.g., from module 120). Module 126 may then indicate to module 122 that data should be retrieved from storage system 112. Module 122 may initiate retrieval of a compound asset (or part) from storage system 112 and staging of the compound asset (e.g., in staging area 131). Module 126 may then communicate with module 128 to access the internal structure of staged asset 130. Based on this information, module 126 may generate at least one restored item 134. To generate restored item 134, directory creator and item server module 126 may receive at least one extracted piece of data from module 128. Then, module 126 may package or format that data such that restored item 134 is in a format that is readable by a file system or the like, for example, a file system of module 120. As one particular example, if module 126 may add appropriate headers to the extracted data to make the data appear as a discrete file to a file system.

In some examples, at least a portion of module 126 (e.g., a portion responsible for creating asset directories like 132), and perhaps related modules like staged asset reader module 128 may be referred to as a directory creator. In one particular example, the term directory creator may refer to examples where the at least a portion of module 126 and related modules are hardware devices that include electronic circuitry for implementing the functionality of these modules described herein. In some examples, at least a portion of module 126 (e.g., a portion responsible for extracting and restoring discrete items like 134), and perhaps related modules like staged asset reader module 128 may be referred to as an item server. In one particular example, the term item server may refer to examples where the at least a portion of module 126 and related modules are hardware devices that include electronic circuitry for implementing the functionality of these modules described herein.

At some point, staged asset 130 may be removed or deleted from storage access system 110. For example, directory creator and item server module 126 may cause staged asset 130 to be deleted. Staged asset 130 may be deleted based on various events, at various times and/or based on various internal heuristics that indicate that the staged asset is no longer needed. For example, staged asset 130 may be removed based on heuristics of past client specific usage patterns (e.g., data access patterns). As another example, staged asset 130 may be removed after a defined timeout period (e.g., a timeout period starting after the requested asset directory or restored item has been generated). As another example, staged asset 130 may be removed when a user logs off of or disconnects from the storage access system 110. As another example, staged asset 130 may be removed when a subsequent request comes in for a different asset directory or restored item (e.g., from a different compound asset). As another example, the staging area (described in more detail above) may have a limited storage size (e.g., based on customer classes), and if that storage size is met, one or more staged assets may be removed or deleted. Creating a staged asset and then removing the staged asset may allow for restoration of discrete items while preventing the need to increase storage space in the cloud computing environment 100 to store shredded versions of all compound assets.

Figure 2:
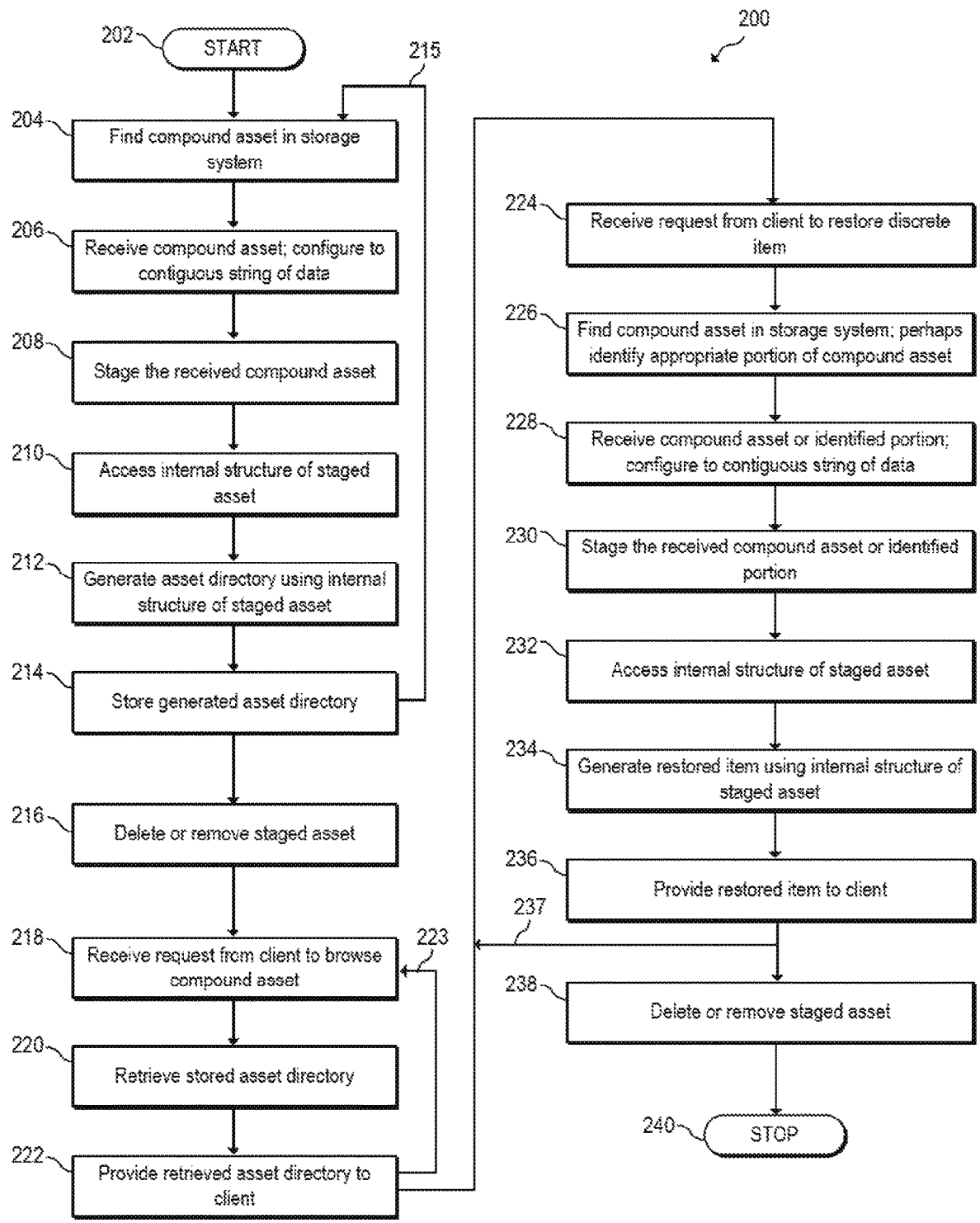
FIG. 2 is a flowchart of an example method for asset browsing and restoration over a network.

FIG. 2 is a flowchart of an example method 200 for asset browsing and restoration over a network using pre-staging and directory storage. The execution of method 200 is described below with reference to a storage access system, which may be similar to storage access system 110 of FIG. 1, for example. Various other suitable systems or computing devices may execute method 200, for example, storage access system 300 of FIG. 3. Method 200 may be implemented in the form of executable instructions stored on a machine-readable storage medium, such as storage medium 320, and/or in the form of electronic circuitry. In alternate embodiments of the present disclosure, one or more steps of method 200 may be executed substantially concurrently or in a different order than shown in FIG. 2. In alternate embodiments of the present disclosure, method 200 may include more or less steps than are shown in FIG. 2. In some embodiments, one or more of the steps of method 200 may, at certain times, be ongoing and/or may repeat. At various steps, method 200 may return to previous steps of method 200. A few examples of returning to previous steps are shown in FIG. 2 and described below; however, other returns from one step to a previous step are possible.

Method 200 may start at step 202 and continue to step 204, where the storage access system (e.g., 110) may find a compound asset (e.g., 140) in a storage system (e.g., 112) in order to proactively create and store an asset directory for the compound asset. At step 206, the storage access system may receive the requested compound asset. The storage access system may configure the received compound asset such that the data is in a contiguous chain, as described above. In some examples, this configuration may be performed in the storage system. At step 208, (e.g., in response to receiving the requested compound asset) the storage access system may stage (e.g., in staging area 131) the received compound asset, as described above. At step 210, the storage access system may access the internal structure of the staged asset (e.g., 130), e.g., using an API (e.g., 128) or the like. The internal structure may provide a list or directory of discrete items within the compound asset. At step 212, the storage access system may generate an asset directory using the internal structure of the staged asset. At step 214, the storage access system may store the generated asset directory in an asset directory repository (e.g., 136). At step 216, the storage access system may delete or remove the staged asset. In FIG. 2, flow arrow 215 shows that method 200 may return to step 204 after step 214. This flow arrow generally represents that the storage access system at various times may create asset directories based on various compound assets, e.g., proactively, before a browsing request is made. Even though flow arrow 215 exits from step 214, it may also exit from step 216, which may represent that a previous staged asset may be deleted before a next compound asset is retrieved to create another asset directory.

At step 218, the storage access system may receive a request (e.g., a browsing request) from a client to browse the compound asset. At step 220, the storage access system may retrieve the stored asset directory that was previously created at stored (e.g., in repository 136). At step 222, the storage access system may provide the asset directory (e.g., 132) to the client, which may allow a user to browse the discrete items of the compound asset. In FIG. 2, flow arrow 223 shows that method 200 may return to step 218 after step 222. This flow arrow generally represents that the storage access system may at various times be ready to receive further browsing requests from the client to further browse the compound asset.

At step 224, the storage access system may receive a request (e.g., a restoration request) from a client to restore a discrete item. For example, the client may select a discrete item included in the above mentioned retrieved, previously-stored directory. At step 226, the storage access system may find a compound asset (e.g., 140) in a storage system (e.g., 112) related to the discrete item. The storage access system may identify a portion of the compound asset that relates to the particular discrete item. At step 228, the storage access system may receive the requested compound asset or identified portion. The storage access system may configure the received compound asset such that the data is in a contiguous chain, as described above. In some examples, this configuration may be performed in the storage system. At step 230, (e.g., in response to receiving the requested compound asset) the storage access system may stage (e.g., in staging area 131) the received compound asset, as described above. At step 232, the storage access system may access the internal structure of the staged asset (e.g., 130), e.g., using an API (e.g., 128) or the like. The internal structure may allow for extraction of discrete items, which may allow discrete items (e.g., those requested by the client at step 204) to be restored instead of restoring the entire compound asset. At step 234, the storage access system may generate a restored item (e.g., 134) using the internal structure of the staged asset. At step 236, the storage access system may provide the restored item to the client. At step 238, the storage access system may delete or remove the staged asset.

In FIG. 2, flow arrow 237 shows that method 200 may return to step 224 after step 236. This flow arrow generally represents that the storage access system may at various times be ready to receive further restoration requests from the client to restore other discrete items of the compound asset. After step 236, method 200 may return to other steps as well, for example, to step 218 to receive further browsing requests from the client. Additionally, in some examples, method 200 may return to previous steps after step 238, which may generally represent that after the staged asset is deleted, the storage access system may still receive further browsing requests (e.g., step 218) or further restoration requests (e.g., step 2240. Method 200 may eventually continue to step 228, where method 200 may stop.

Figure 3:
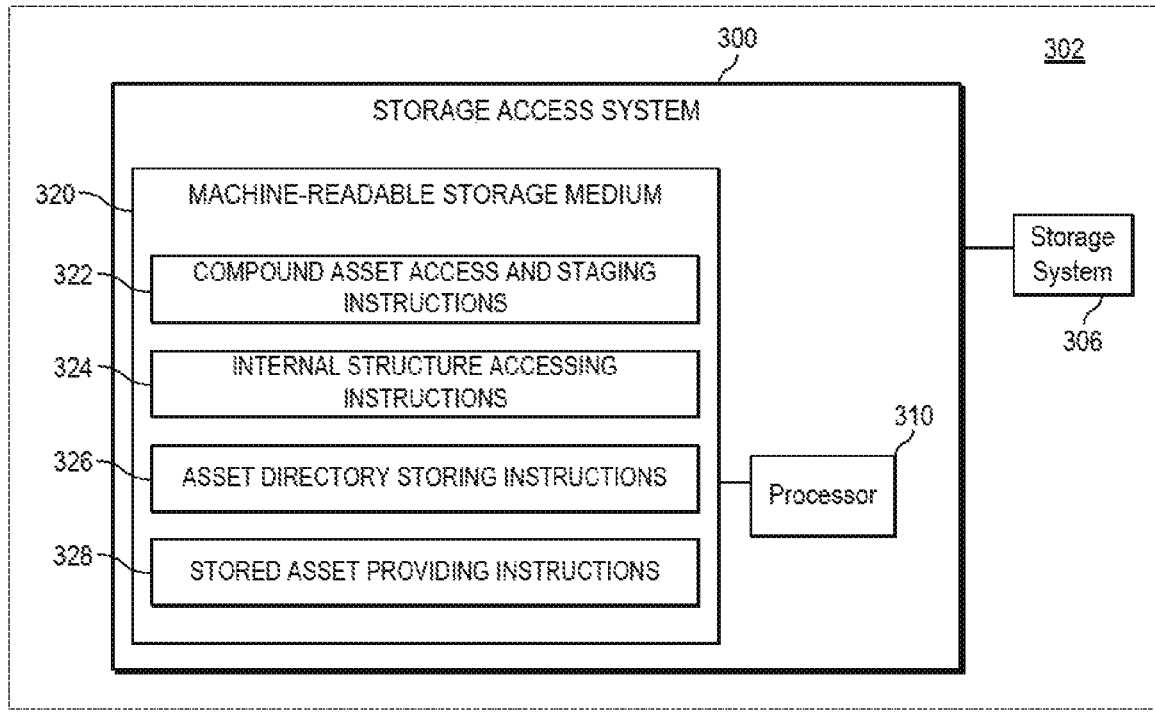
FIG. 3 is a block diagram of an example storage access system for asset browsing and restoration over a network.

FIG. 3 is a block diagram of an example storage access system 300 for asset browsing and restoration over a network using pre-staging and directory storage. Storage access system 300 may be part of a storage environment 302. Storage access system may be at least one computing device that is capable of communicating with at least one storage system (e.g., 306). More details regarding an example storage access system may be described above, for example, with respect to storage access system 110 of FIG. 1. In the embodiment of FIG. 3, storage access system 300 includes a processor 310 and a machine-readable storage medium 320.

Processor 310 may be one or more central processing units (CPUs), microprocessors, and/or other hardware devices suitable for retrieval and execution of instructions stored in machine-readable storage medium 320. In the particular embodiment shown in FIG. 3, processor 310 may fetch, decode, and execute instructions 322, 324, 326, 328 to facilitate asset browsing and restoration over a network using pre-staging and directory storage. As an alternative or in addition to retrieving and executing instructions, processor 310 may include one or more electronic circuits comprising a number of electronic components for performing the functionality of one or more of instructions in machine-readable storage medium 320. With respect to the executable instruction representations (e.g., boxes) described and shown herein, it should be understood that part or all of the executable instructions and/or electronic circuits included within one box may, in alternate embodiments, be included in a different box shown in the figures or in a different box not shown.

Machine-readable storage medium 320 may be any electronic, magnetic, optical, or other physical storage device that stores executable instructions. Thus, machine-readable storage medium 320 may be, for example, Random Access Memory (RAM), an Electrically-Erasable Programmable Read-Only Memory (EEPROM), a storage drive, an optical disc, and the like. Machine-readable storage medium 320 may be disposed within storage access system 300, as shown in FIG. 3. In this situation, the executable instructions may be "installed" on the system 300. Alternatively, machine-readable storage medium 320 may be a portable (e.g., external) storage medium, for example, that allows storage access system 300 to remotely execute the instructions or download the instructions from the storage medium. In this situation, the executable instructions may be part of an "installation package". As described herein, machine-readable storage medium 320 may be encoded with executable instructions for asset browsing and restoration over a network using pre-staging and directory storage.

Compound asset access and staging instructions 322 may access a compound asset in a storage system and restore it as a staged asset in a staging area of the storage access system before receiving an indication from a client device to browse at least a portion of the compound asset. Internal structure accessing instructions 324 may access the internal structure of the staged asset to generate an asset directory. The asset directory may indicate discrete items within the compound asset. Asset directory storing instructions 326 may store the asset directory in the storage access system. Stored asset providing instructions 328 may provide the stored asset directory or a portion of the stored asset directory to the client device over a network in response to an indication from the client device to browse the compound asset.

Figure 4:
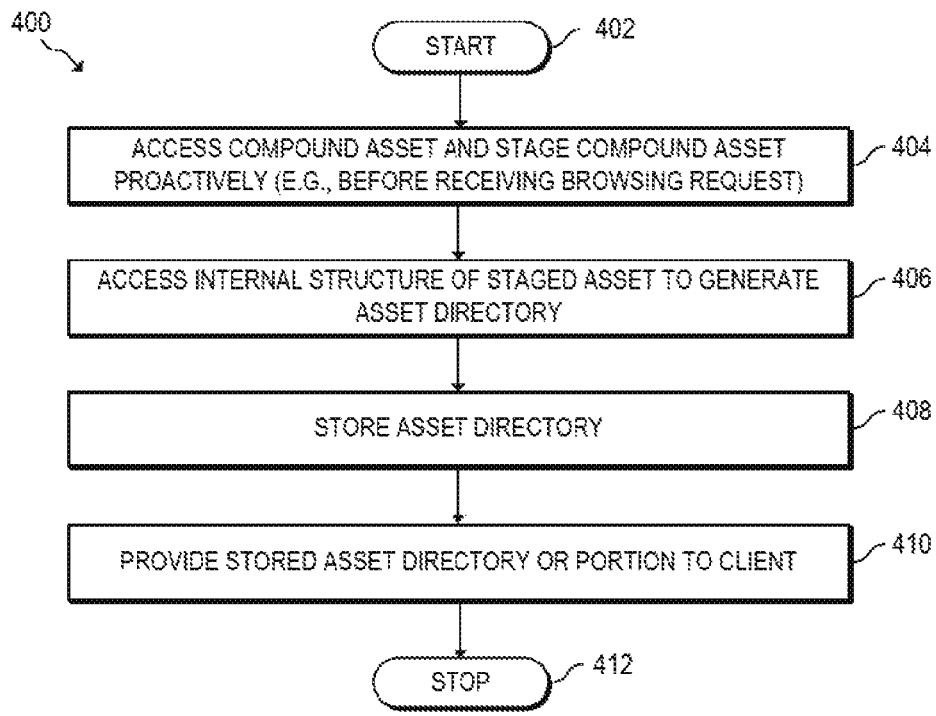
FIG. 4 is a flowchart of an example method for asset browsing and restoration over a network.

FIG. 4 is a flowchart of an example method 400 for asset browsing and restoration over a network using pre-staging and directory storage. Method 400 may be described below as being executed or performed by storage access system 300; however, other suitable computing devices or systems may be used as well, for example, storage access system 110 of FIG. 1. Method 400 may be implemented in the form of executable instructions stored on a machine-readable storage medium, such as storage medium 320, and/or in the form of electronic circuitry. In alternate embodiments of the present disclosure, one or more steps of method 400 may be executed substantially concurrently or in a different order than shown in FIG. 4. In alternate embodiments of the present disclosure, method 400 may include more or less steps than are shown in FIG. 4. In some embodiments, one or more of the steps of method 400 may, at certain times, be ongoing and/or may repeat.

Method 400 may start at step 402 and continue to step 404, where a storage access system may access a compound asset in the storage system and restoring it as a staged asset in a staging area of the storage access system before receiving an indication from a client device to browse at least a portion of the compound asset. At step 406, the storage access system may access the internal structure of the staged asset to generate an asset directory. The asset directory may indicate discrete items within the compound asset. At step 408, the storage access system may store the asset directory in the storage access system. At step 410, the storage access system may provide the stored asset directory or a portion of the stored asset directory to the client device over a network in response to an indication from the client device to browse the compound asset. Method 400 may eventually continue to step 412, where method 400 may stop.

The invention claimed is:

1. A method executed in a storage access system for browsing and restoring assets of a storage system, the method comprising:
before a server receives a request from a client device to browse a compound asset stored in the storage system, accessing, by a processor of the server in the storage access system, the compound asset and restoring the compound asset of the storage system as a staged asset in a staging area of the storage access system;
accessing, by the processor, an internal structure of the staged asset after the compound asset has been restored as the staged asset in the staging area;
creating, by the processor, an asset directory of the compound asset based on the internal structure of the staged asset, wherein the asset directory of the compound asset indicates discrete items within the compound asset;
storing, by the processor, the asset directory of the compound asset in the storage access system;
providing, by the processor, the stored asset directory of the compound asset to the client device over a network in response to receiving the request from the client device to browse the compound asset of the storage system;
accessing, by the processor, a second request to restore a discrete item from among the discrete items indicated by the stored asset directory;
restoring, by the processor, the discrete item responsive to the second request; and
providing, by the processor, the restored discrete item to the client device.

2. The method of claim 1, wherein the asset directory of the compound asset is stored in a directory repository of the storage access system along with other asset directories that were proactively created for other compound assets.

3. The method of claim 1, further comprising providing a subsequent portion of the stored asset directory to the client device over the network in response to a subsequent request from the client device to browse the compound asset such that portions of the asset directory are provided on-the-fly in response to browsing indications of the client.

4. The method of claim 1, further comprising:
accessing a portion of the compound asset in the storage system and restoring the portion of the compound asset as the staged asset in the staging area of the storage access system in response to a third request from the client device to restore a second discrete item from among the discrete items; and
accessing the internal structure of the staged asset to generate the restored second discrete item.

5. The method of claim 1, further comprising removing or deleting the staged asset from the storage access system after the asset directory is stored in the storage access system.

6. The method of claim 1, wherein restoring the compound asset as the staged asset in the staging area includes configuring multiple component pieces of data of the compound asset such that the staged asset is a contiguous, sequential chain of data.

7. The method of claim 6, wherein the multiple component pieces of data of the compound asset are stored in the storage system across more than one storage device of the storage system.

8. The method of claim 1, wherein the creating of the asset directory of the compound asset is performed using an application programming interface (API).

9. A server in a storage access system for asset browsing and restoration, the server comprising:
a processor; and
a memory storing instructions that when executed cause the processor to:
retrieve a compound asset stored in a storage system;
store the compound asset as a staged asset that is a contiguous, sequential chain of data;
access an internal structure of the staged asset after the compound asset has been stored as the staged asset and before the server receives a request from a client device to browse the compound asset;
create an asset directory of the compound asset based on the internal structure of the staged asset and store the asset directory of the compound asset in a directory repository of the storage access system, wherein the asset directory of the compound asset indicates discrete items within the compound asset;

provide the stored asset directory of the compound asset to the client device over a network in response to receipt of the request from the client device to browse the compound asset;

access a second request to restore a discrete item from among the discrete items indicated by the stored asset directory;

restore the discrete item responsive to the second request; and provide the restored discrete item to the client device.

10. The server in the storage access system of claim 9, wherein the instructions are executable to cause the processor to retrieve the compound asset stored in the storage system after a defined period of time from a previous time the asset directory was created or changed.

11. A non-transitory machine-readable storage medium storing instructions executable by a processor of a server in a storage access system to cause the processor to:

access a compound asset in a storage system and restore the compound asset received from the storage system as a staged asset in a staging area of the storage access system;

create an asset directory of the compound asset based on an internal structure of the staged asset before the server receives the request from a client device to browse the compound asset, wherein the asset directory indicates discrete items within the compound asset;

store the asset directory of the compound asset in the storage access system;

provide the stored asset directory of the compound asset to the client device over a network in response to receiving the request from the client device to browse the compound asset;

access a second request to restore a discrete item from among the discrete items indicated by the stored asset directory;

restore the discrete item responsive to the second request; and provide the restored discrete item to the client device.

12. The non-transitory machine-readable storage medium of claim 11, wherein the instructions are executable to cause the processor to:

access a portion of the compound asset in the storage system and restore the portion of the compound asset as the staged asset in the staging area of the storage access system in response to another request from the client device requesting a second discrete item to restore; and access the internal structure of the staged asset to generate the restored second discrete item.

13. The non-transitory machine-readable storage medium of claim 12, wherein the instructions are executable to cause the processor to:

provide the restored second discrete item to the client device over the network without providing all data of the compound asset to the client device over the network.

14. The non-transitory machine-readable storage medium of claim 11, wherein the instructions are executable to cause the processor to:

remove or delete the staged asset from the storage access system after the asset directory is stored in the storage access system.

15. The server of claim 9, wherein the instructions are executable to cause the processor to:

receive a first request to browse the compound asset;

provide, responsive to the first request, a first portion of the asset directory to the client device;

receive a second request to browse a second portion not provided in the first portion;

update the asset directory based on the second portion; and provide the updated asset directory to the client device.

16. The server of claim 9, wherein the instructions are executable to cause the processor to:

receive, from the client device, a request to restore a first portion of the compound asset;

provide, responsive to the request, the first portion of the compound asset;

predict that a second portion of the compound asset related to the first portion but not requested for restoration by the client device will be requested for restoration; and restore the second portion of the compound asset based on the prediction.

* * * * *